Fig. 1.

March 9, 1971  J. A. CARROLL  3,568,231
VEHICLE WASHING APPARATUS
Filed Oct. 14, 1968  9 Sheets-Sheet 6

INVENTOR.
JAMES A. CARROLL
BY
Arnold, Roylance, Kruger & Durkee
ATTORNEYS

March 9, 1971 J. A. CARROLL 3,568,231
VEHICLE WASHING APPARATUS
Filed Oct. 14, 1968 9 Sheets-Sheet 8

INVENTOR.
JAMES A. CARROLL
BY
Arnold, Roylance, Kruger & Durkee
ATTORNEYS

Fig.15.

United States Patent Office 3,568,231
Patented Mar. 9, 1971

3,568,231
VEHICLE WASHING APPARATUS
James A. Carroll, 11708 135th St.,
Edmonton, Alberta, Canada
Filed Oct. 14, 1968, Ser. No. 767,413
Int. Cl. B60s 3/06
U.S. Cl. 15—21                                    8 Claims

ABSTRACT OF THE DISCLOSURE

Apparatus for washing motor vehicles, characterized by employing rotary cleaning devices, such as brushes, in such fashion that the rotary cleaning devices are positively urged against the vehicle throughout a working cycle during which one cleaning device traverses first one half of the front of the vehicle, then all of one side of the vehicle, and finally one half of the rear of the vehicle. Each brush or the like is supported by a carriage arranged for rectilinear travel along a line which diverges from the path along which the vehicle being washed is moved. A rectilinear power device is arranged to move the carriage toward the path of travel of the vehicle and the power device yieldably opposes movement of the carriage in the opposite direction. The brush or the like is supported on its carriage by a swinging arm, swinging movement of the arm being limited in one direction by a stop and in the other direction by a device which yieldably opposes the swinging movement and is capable of returning the arm to the limit determined by the stop device. The rectilinear power device is controlled automatically, in response to swinging movement of the arm, so as to respond to the position of the brush or the like relative to the vehicle being washed.

---

This invention relates to apparatus for washing motor vehicles and the like, and particularly to such apparatus wherein the vehicle or like object to be washed is moved through the apparatus along a predetermined path of travel.

Apparatus of the type described have achieved wide commercial acceptance, particularly in automobile washing installations serving the general public. Though many different types of such apparatus have been proposed, one of the more successful combines the action of liquid sprays with rotary mechanical cleaning devices such as brushes. Despite the success of such apparatus in the prior art, there has been a continuing need for improvement, and particularly for a solution to the problem of maintaining the brushes or the like in positive engagement at all times with the vehicle being washed.

It is accordingly a general object of the invention to provide an improved apparatus of the type described which automatically maintains a predetermined positive pressure engagement between the brush or like cleaning device and the vehicle or other object being washed.

Another object is to devise such a vehicle washing apparatus which requires less floor space, and is simpler and easier to maintain, than has been true of prior-art apparatus.

A further object is to provide such a washing apparatus wherein two brush units are employed, each on a different side of the path of travel of the vehicles to be washed, each brush unit being so operated as to carry out a cleaning cycle during which the brush is maintained in positive engagement first with half of the front of the vehicle, then with the corresponding side of the vehicle, and finally with half of the rear of the vehicle.

Broadly stated, apparatus in accordance with the invention comprise two units disposed each on a different side of the path of travel of the vehicles, each unit comprising a brush or like cleaning device supported by a carriage which is arranged for rectilinear travel along a line which diverges from the path of travel of the vehicle being washed, the arrangement being such that the carriage can be moved away from the path of travel, when the brush is engaged with the front of an advancing vehicle, and is moved toward the path of travel, by an automatically controlled power device, when the brush engages the side of the vehicle. In the most advantageous embodiment of the invention, the brush is supported on the carriage by means of an arm which is mounted to pivot about an upright axis, the arm projecting from its pivot point toward the path of travel of the vehicles. Swinging movement of the arm generally in the direction of travel of the vehicle being washed is limited by a positive stop device, and swinging movement in the opposite direction is limited by means including a device for yieldably resisting such movement. An automatic control is provided for energizing and deenergizing the rectilinear power means in response to swinging movement of the arm, and thus in response to the position of the brush relative to the vehicle being washed.

In order that the manner in which the foregoing and other objects are attained in accordance with the invention can be understood in detail, one particularly advantageous embodiment thereof will be described with reference to the accompanying drawings, which form a part of the original disclosure of this application, and wherein:

FIGS. 7–15 are sequence diagrams illustrating the relative positions of parts of the apparatus at various stages of the operation thereof.

Turning now to the drawings in detail, the illustrated embodiment of the invention comprises the usual track 1 along which vehicles V are moved, as by a conventional chain mechanism 2. Two brush units, indicated generally at 3 and 4, are employed, each brush unit being situated on a different side of the path of travel defined by track 1 and chain mechanism 2 for the vehicles to be washed.

Brush units 3 and 4 are complementary, that is, their constructions are mutually identical save for the differences in positions necessitated by the fact that the two units are on opposite sides of track 1. Accordingly, only unit 4 will be described in detail. Brush unit 4 comprises a frame 5 secured rigidly to the floor of the building in which the apparatus is installed, upper and lower parallel rails 6 and 7, respectively, a carriage 8 arranged for rectilinear movement along rails 6, 7, an arm structure 9 which is pivotally mounted on carriage 8 and extends from its pivot point toward track 1, and a rotary brush 38 mounted at the free end of the arm structure for rotation about an upright axis.

Carriage 8 is in the form of a rigid structure comprising two spaced uprights 11, 12 interconnecting an upper horizontal member 13 and a lower horizontal member 14. Members 13, 14 are of equal length, and upright 11 is located between adjacent ends of the two horizontal members, upright 12 being connected to points respectively intermediate the ends of the two horizontal members so that the forward ends of the two horizontal members are left free to accommodate the pivot means by which arm structure 9 is mounted on the carriage. A gusseted clamp 15 is rigidly secured to the lower surface of upper member 13, and a similar clamp 16 is rigidly secured to the upper surface of lower member 14, the two clamps being vertically aligned and located at the forward ends of the two horizontal members. An upright pivot shaft 17 extends between, and is rigidly mounted on the carriage by, the two clamps 15, 16.

Two wheels 18, journaled on suitable brackets, are mounted on the upper surface of upper member 13 at the respective ends of that member. Two wheels 19 are similarly mounted on the lower surface of lower member 14. Rails 6, 7 are of V-shaped transverse cross section, the lower rail being inverted, and wheels 18, 19 have grooved peripheries of V-shaped transverse cross-section appropriate to receive the rails. The height of the carriage is such that the same can be engaged between rails 6, 7, with wheels 18 engaging rail 6 and wheels 19 engaging rail 7, so that the carriage is constrained to move rectilinearly along the rails.

Figure 1:
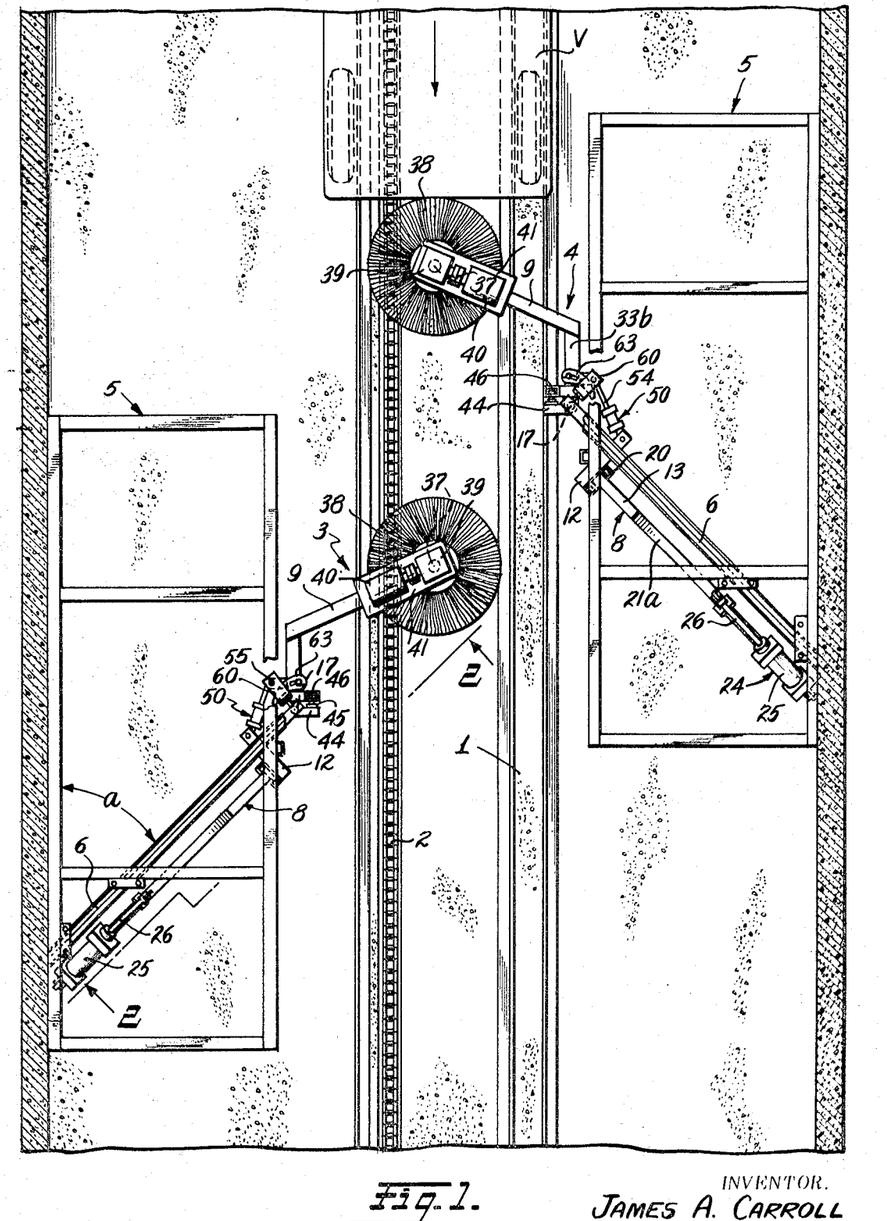
FIG. 1 is a top plan view of an automobile washing apparatus in accordance with one embodiment of the invention.
Figure 2:
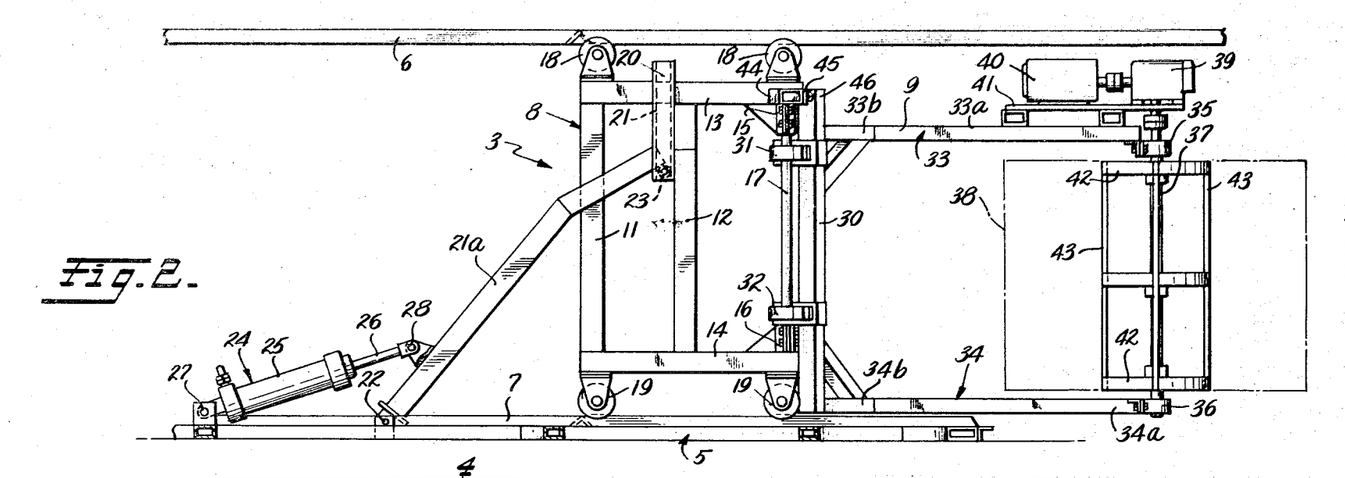
FIG. 2 is a side elevational view, taken generally on line 2—2, FIG. 1, and on larger scale than FIG. 1, illustrating one of the brush units of the apparatus, with the carriage extended toward the path of travel of the vehicle.
Figure 3:
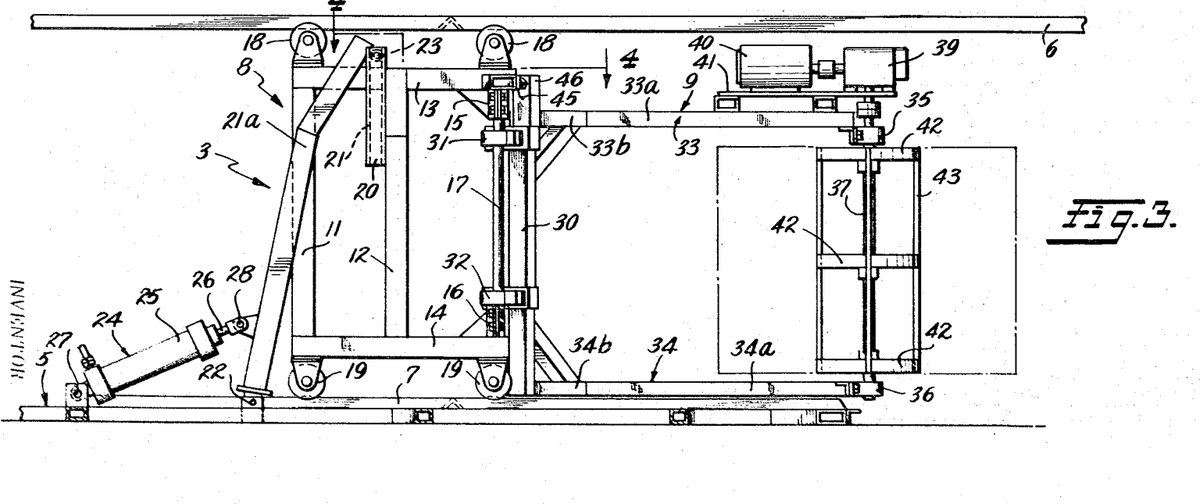
FIG. 3 is a view similar to FIG. 2 but with the carriage in a retracted position.

The disposition of frame 5 and rails 6, 7 is such that movement of carriage 8 is confined to a line of travel which diverges from the path defined by track 1 at an angle of approximately 45°. As will be apparent from later discussion, the angle of 45°, indicated at a in FIG. 1, is particularly advantageous. Depending upon particular circumstances of design and use, however, the angle a can be selected within the range of 15–85°.

Secured to one side of upright 12 and member 13 of the carriage is a vertically extending roller guide track 20 in the nature of a hollow metal member of rectangular transverse cross section and provided with a slot 21 opening toward the rear of the carriage. A lever 21a is mounted on the lower portion of frame 5, at a point immediately adjacent lower rail 7, in such fashion as to pivot freely about the horizontal axis defined by pivot pin 22, this axis extending at right angles to the common plane of rails 6, 7. At its free end, lever 21 is provided with a pair of rollers 23 mounted on the lever for free rotation about a common horizontal axis which extends transversely of the lever. Rollers 23 are disposed in free rolling engagement with the inner front and rear surfaces of guide track 20.

A hydraulic rectilinear power device 24 is provided to drive the carriage 8 forwardly (toward track 1) when the device 24 is energized. The power device comprises a cylinder 25 suitably equipped with a piston (as at 26a, FIG. 6) secured to a shaft 26. Cylinder 25 is pivotally mounted on a lower member of frame 5, as by pivot pin 27, so as to be swingable about the horizontal axis defined by pin 27. The outer end of shaft 26 is equipped with a clevis and is pivotally connected to lever 21, as by pivot pin 28. Lever 21 and power device 24 lie in a common vertical plane parallel to and beside the plane of rails 6, 7. Pivot pins 22, 27 and 28 are mutually parallel. When pressure fluid is supplied to the right hand end of cylinder 25 (as viewed in FIG. 6), shaft 26 is extended, causing lever 21 to swing forwardly and downwardly, with rollers 23 descending in guide track 20, so that carriage 8 is driven forwardly. When the carriage moves in the opposite direction, lever 21 swings rearwardly and upwardly, against the frictional resistance of the supporting wheels, pivotal connections, and other moving parts.

Arm structure 9 comprises an upright member 30 to which are secured two mutually aligned bearings 31, 32 in which the pivot shaft 17 is journaled. Lower bearing 32 engages the upper end of clamp 16, thereby supporting the weight of the arm structure 9 and fixing the vertical position thereof. The remainder of the arm structure includes two identical rigid members 33, 34, each made up of a longer straight portion 33a and 34a, respectively, and a shorter straight portion 33b and 34b, respectively. The shorter portions 33b and 34b project from the longer portions 33a and 34a at equal acute angles and are rigidly secured at their ends to the upper and lower end portions, respectively, of upright member 30. When the longer portions 33a and 33b are parallel to carriage 8, the plane in which the longer portions 33a and 33b lie is offset to one side of the carriage and are disposed on the side of the carriage opposite lever 21.

An upper bearing 35 is secured to the free end of longer portion 33a, and a lower bearing 36 is similarly secured to the free end of longer portion 34a, bearings 35 and 36 being vertically aligned. The shaft 37 of a rotary brush 38 is journaled in bearings 35, 36 and extends upwardly from bearing 35 to an operative connection with the output shaft of a right angle gear box 39 driven by an electric motor 40, the gear box and motor being mounted on a base 41 rigidly secured to the upper surface of longer portion 33a. Brush 38 comprises three axially spaced circular plates 42 rigidly secured to shaft 37 and provided with peripheral notches to accommodate a plurality of bristle mounting strips 43 which extend parallel to shaft 37 and carry the lengthy bristles of the brush. Brushes of the type shown and described are commercially available and, as will be understood by those familiar with the art, can be manufactured in a size sufficient to be capable of engaging and cleaning the entire lateral surface of an automobile in one cycle of operation.

Figures 4, 5:
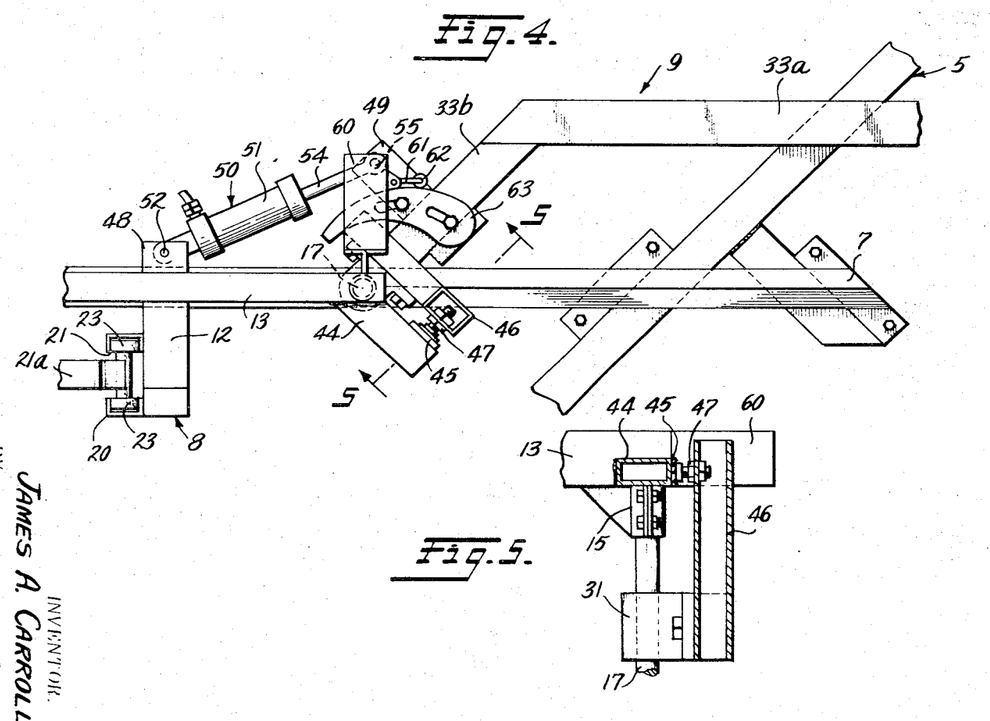
FIG. 4 is an enlarged fragmentary top plan view taken generally on the line 4—4, FIG. 3.
FIG. 5 is an enlarged fragmentary vertical sectional view taken generally on line 5—5, FIG. 4.

As best seen in FIGS. 4 and 5, a projection 44 is rigidly secured to upper member 13 of carriage 8 immediately adjacent to clamp 15 and carries a stop member 45 of rubber or like compressible material. Stop member 45 is in the nature of a flat pad arranged with its major faces extending at such an angle to the plane of the carriage that the stop member is approximately at right angles to shorter arm portions 33b, 34b when arm structure 9 is disposed with its longer portions 33a, 34a parallel to the carriage. A bracket 46 is rigidly secured to the upright member 30 of the arm structure and carries an adjustable stop member 47, which can be in the nature of a bolt extending through a vertical plate of bracket 46 and secured rigidly thereto in adjusted position by a cooperating pair of nuts disposed each in engagement with a different side of the vertical plate. Member 47 projects toward stop member 45 in such fashion that its enlarged head is disposed to engage stop member 45 when arm structure 9 is swung in a direction which is generally the direction of travel of the vehicle being washed.

Suitably secured to upright 12 of carriage 8 is a bracket 48. Another bracket 49 is secured to arm structure 9 in horizontal alignment with bracket 48. To both limit the extent of travel of arm structure 9, when the arm structure is swung away from stop member 45, and yieldably resist such swinging movement of the arm structure, an air pressure-biased expansible chamber device 50 is connected between brackets 48 and 49. Device 50 includes a cylinder 51 connected to bracket 48 for pivotal movement about the vertical axis defined by pivot pin 52, a suitable piston (seen at 53, FIG. 6), and a shaft 54 connected to bracket 49 for pivotal movement about the axis defined by pivot pin 55. As will be understood from FIG. 6 and later discussion, introduction of air under pressure into cylinder 51 tends to cause shaft 54 to extend and therefore tends to swing arm structure 9 to the limit determined by stop members 45, 47, and swinging movement of the arm structure in the opposite direction is yieldably opposed by device 50 to an extent determined by the air pressure and the freedom for passage of air from the cylinder in response to forces urging shaft 54 inwardly. It will be apparent that, if swinging movement of arm structure 9 is unopposed, supply of air under pressure to cylinder 51 will be effective to swing the arm structure to the full extent allowed by stop members 45, 47.

A three-way switching valve 60 is secured to a mounting plate carried by upper clamp 15 in such fashion that valve 60 is located on the side of carriage 8 opposite stop members 45, 47. Valve 60 is of conventional construction and is operated by a pivoted arm 61 carrying a roller 62, the arm being biased to a first position, hereinafter described, and actuatable to a second position. Rigidly secured to the upper surface of shorter arm portion 34b is a generally arcuate cam plate 63 having an edge constituting a cam surface with which the roller 62 is engaged. When the arm structure 9 is swung toward stop member 45, the cam surface of cam plate 63 retreats, allowing arm 61 to pivot under its normal bias to its first position. When the arm structure 9 is swung in the opposite direction, the cam surface of cam plate 63 forces roller 62 to pivot arm 61 to its second position, causing the valve to energize rectilinear power device 24 to drive carriage 8 toward track 1.

Figure 6:
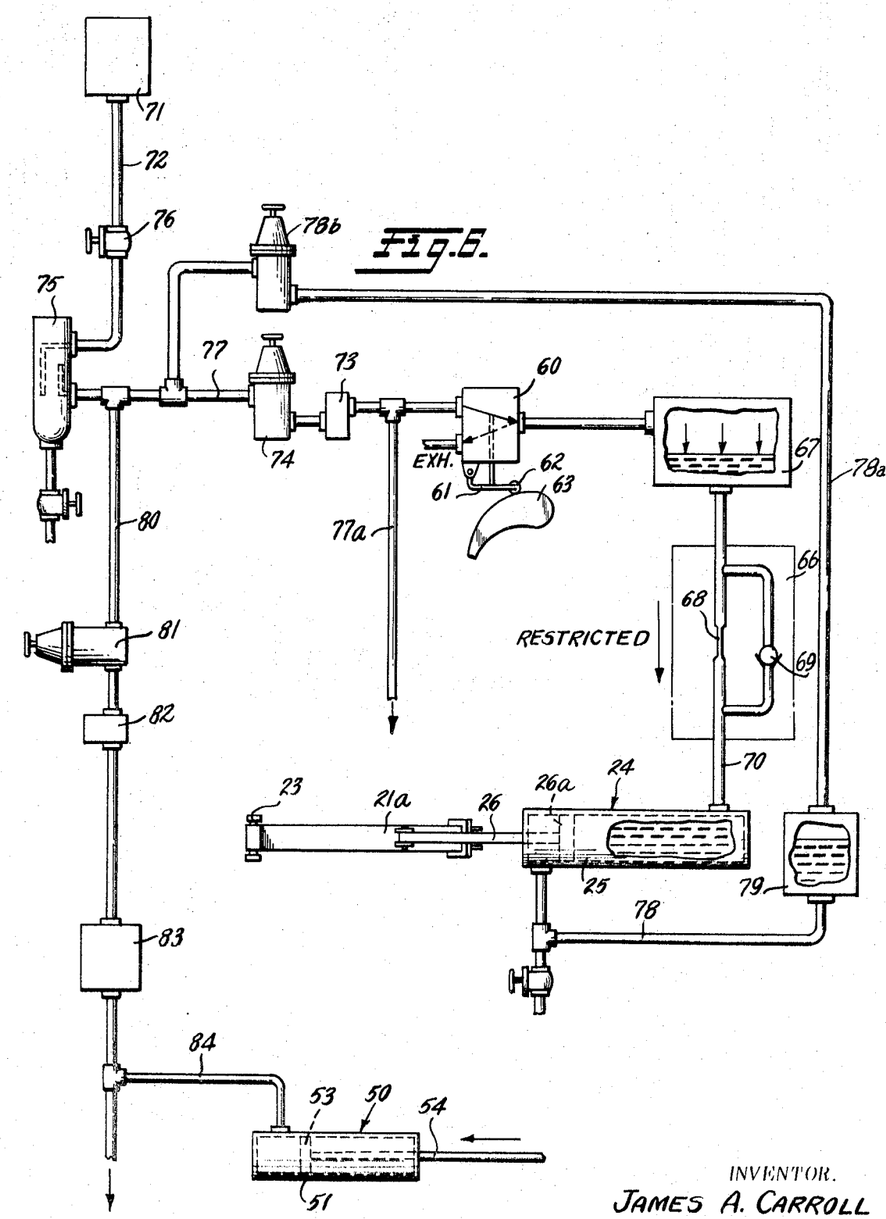
FIG. 6 is a schematic diagram of the control system employed in the apparatus of FIG. 1.

Referring to FIG. 6, it will be seen that the control means employed for the apparatus of FIG. 1 comprises, for each rectilinear power device 24 employed, a hydraulic flow control device 66, a hydraulic reservoir 67, and one of the two-way switching valves 60. Flow control device 66 comprises a flow regulating restriction, indicated at 68, and a check valve 69 connected in parallel with the restriction 68 to allow free fluid flow from device 24 to reservoir 67. Reservoir 67 is connected directly to cylinder 25 via restriction 68 by conduit 70. Reservoir 67 is of the conventional type in which hydraulic pressure is generated by introduction of compressed air into the reservoir above the hydraulic fluid. Accordingly, the upper portion of reservoir 67 can be connected to a source of compressed air, such as air compressor 71, via conduit 72, valve 60 (when that valve is in its second position), lubricator 73, pressure regulator 74, water separator 75, shut-off valve 76, and conduit 77. A branch conduit 77a is provided, connected between valve 60 and lubricator 73, so that additional rectilinear power devices, each equipped with a flow control device 66, a reservoir 67 and a switching valve 60, can be connected for energization from the same compressed air source 71.

On the side of piston 26a adjacent shaft 26, cylinder 25 is connected via conduit 78 to a hydraulic reservoir 79, the upper portion of the reservoir being connected via a conduit 78a and a pressure regulator 78b to compressed air line 77, so that a regulated hydraulic pressure is supplied in cylinder 25 on the left hand side of piston 26a (as viewed in FIG. 6), this pressure being less than the forward driving pressure but adequate to effectively eliminate the frictional forces tending to resist movement of carriage 8 away from track 1 when valve 60 has been operated to disconnect reservoir 67 from conduit 77. Typically, regulators 74 and 78b can be adjusted to provide a hydraulic pressure of about 80 p.s.i. to drive piston 26a to the left (as viewed in FIG. 6) and about 26 p.s.i. to bias piston 26a in the opposite direction.

Air compressor 71 is also used as the source of biasing air pressure for the expansible chamber devices 50 of all of the brush units. Thus, a conduit 80, including the series combination of pressure regulator 81, lubricator 82, and air surge accumulator 83, is connected between water separator 75 and pressure regulator 74, and branch conduits 84 are connected respectively to the cylinders 51 of the devices 50.

So long as shut-off valve 76 is open, a regulated air pressure is supplied to the cylinder 51 of device 50 so as to bias the arm structure 9 of each brush unit toward the fixed stop 45, the magnitude of the air pressure and the design parameters of device 50 being so selected that, while the arm structure 9 can be swung away from stop 45, a significant force is required to overcome the biasing effect of the device 50 and accomplish such swinging action.

When valve 60 is in its normal position, its effect is to connect the upper portion of reservoir 67 to the atmosphere and the shaft 26 of power device 24 can therefore be retracted by application of a proper force via brush 38, arm structure 9 and carriage 8, frictional resistance being effectively eliminated by the hydraulic biasing pressure from reservoir 79. When arm structure 9 is pivoted away from stop 45 adequately to cause cam plate 63 to actuate the valve 60 to its other position, air under pressure from compressor 71 is supplied to reservoir 67 and hydraulic fluid is accordingly supplied to the cylinder 25 of power device 24 at a selected rate determined by restriction 68, with the result that shaft 26 is progressively extended, and brush 38 is correspondingly urged against the surface being cleaned. It is to be understood that such progressive extension of shaft 26 continues until the arm structure is again swung back toward stop 45 adequately to move cam plate 63 to an extend allowing valve 60 to return to its first or normal position, or until shaft 26 has reached its maximum limit of travel.

Figure 7:
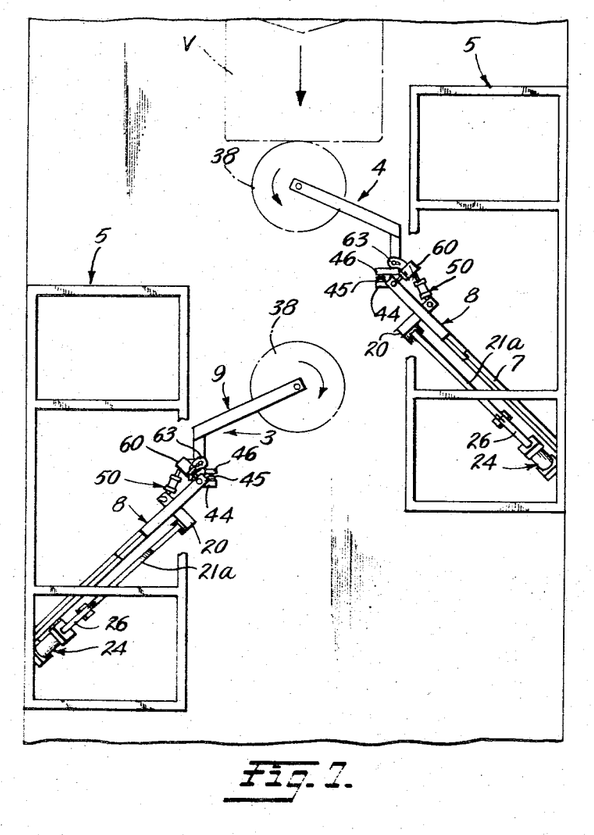

Overall operation of the apparatus will be apparent from the foregoing description and the sequence diagrams of FIGS. 7–15. FIG. 7 illustrates the apparatus with the components of both brush units 3, 4 in their initial position, as the vehicle V just comes into contact with the brush 38 of unit 4. At this stage, the arm structures 9 of both brush units are in such position that stop member 47 is engaged with stop member 45, and the carriages 8 of both units are in their fully extended positions.

Figure 8:
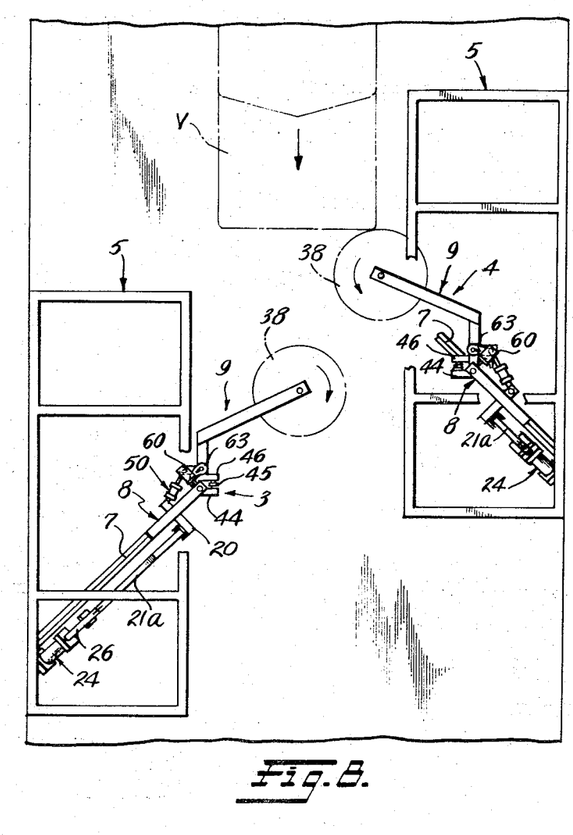

As the vehicle advances against the brush of unit 4, rotation of brush 38 (counter-clockwise as viewed in FIG. 7) causes the brush to progress from the center of the front of the vehicle toward the front corner of the vehicle nearest unit 4, the brush, in effect, rolling along the surfaces of the vehicle, as will be clear from FIG. 8. Since stop 47 of unit 4 is initially engaged with stop 45, and since such engagement is maintained by the force applied to brush 38 due to advance of vehicle V, brush 38 is positively engaged with the vehicle as the brush progresses toward the front corner of the vehicle, and the force applied to the brush by the advancing vehicle is transferred through arm structure 9 to carriage 8, causing the carriage to move along tracks 6, 7 away from the vehicle. Such movement of the carriage is aided by the hydraulic biasing pressure afforded by reservoir 79, and the force developed from the brush-to-car contact therefore need not in itself be great enough to overcome frictional forces tending to resist movement of the carriage, and undue wear of the brush, and the danger of engagement of rigid members of the brush structure with the vehicle, are eliminated.

Figure 9:
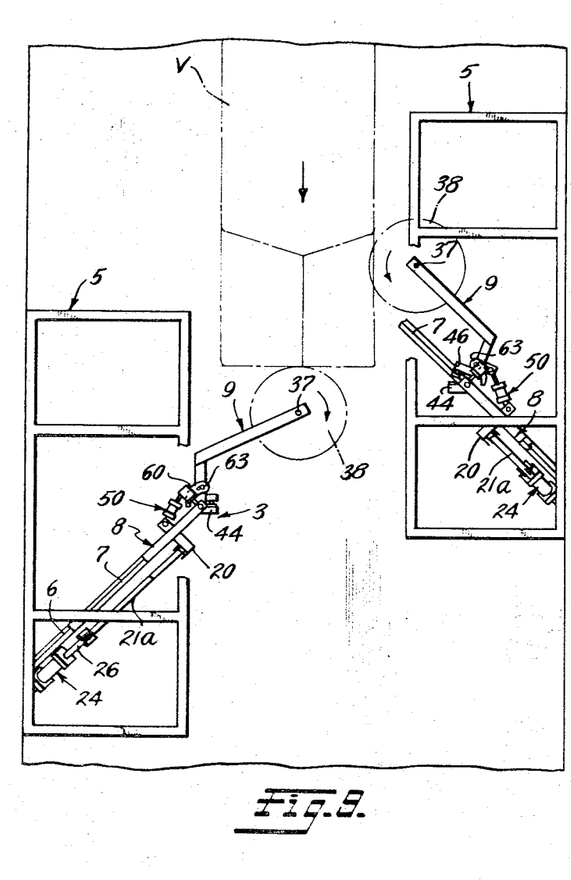
Figure 10:
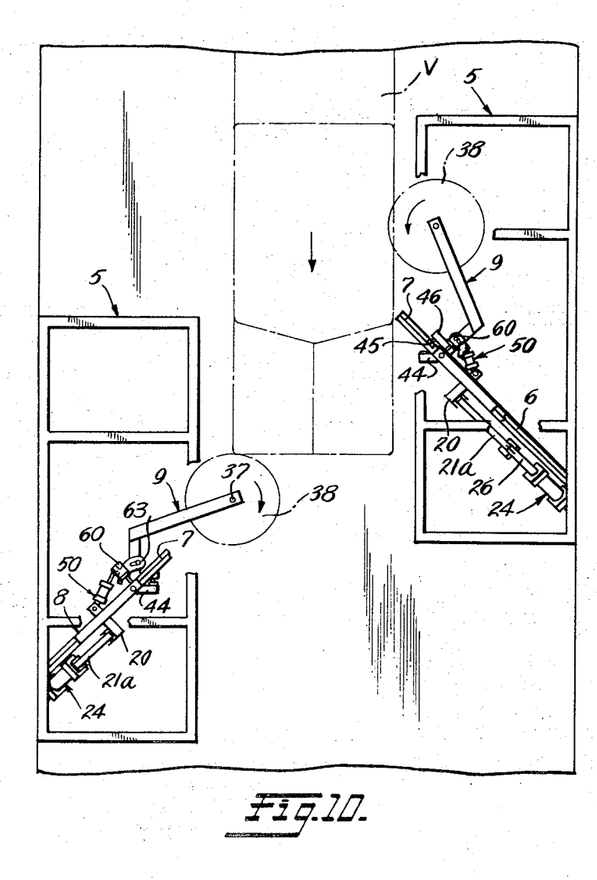

Further advance of the vehicle V causes brush 38 to round the front corner of the vehicle, as will be apparent from a comparison of FIGS. 8 and 9. The position of brush unit 4 relative to the path of travel of the vehicle V, and the effective combined lengths of carriage 8 and arm structure 9 at the time the brush rounds the corner of the vehicle, are such that the continued rolling action of the brush along the vehicle causes arm structure 9 to be swung away from stop 45, this swinging movement occurring against the yielding opposition applied by expansible chamber device 50. As a result of this swinging movement, cam plate 63 is moved to a position in which its cam surface forces roller 62 in a direction actuating valve 60 to its second position, causing air under pressure to be supplied to the upper portion of reservoir 67 so that hydraulic fluid is forced from the reservoir through restriction 68 into the cylinder 25 of power device 24. Accordingly, substantially as the brush 38 rounds the front corner of vehicle V, power device 24 is energized to advance carriage 8 toward the vehicle at a predetermined rate and therefore progressively urge brush 38 against the side of the vehicle. Such action continues as the vehicle is moved past the brush unit, the rate of advance of carriage 9 toward the vehicle being such that the arm structure 9 is swung progressively away from stop member 45 until, as brush 38 reaches the rear corner of the vehicle, as seen in FIG. 12, arm structure 9 has reached or neared the limit of travel afforded by device 50.

When brush 38 of unit 4 has rounded the corresponding front corner of the vehicle, brush 38 of unit 3 is engaged by the central portion of the front of the vehicle, as seen in FIG. 9. In this connection, it will be noted that unit 3 is spaced from unit 4, in the direction of travel of the vehicles to be washed, by a distance adequate to assure that the brush of unit 4 will have rounded its front corner of the vehicle before the brush of unit 3 actively engages the vehicle. As the adjacent side of the vehicle moves past the brush of unit 4, the brush of unit 3 is moved progressively over the adjacent half of the front of the vehicle and, rounding the corresponding front corner of the vehicle, comes into engagement with the adjacent side of the vehicle in the same manner hereinbefore described for brush unit 4, this action being apparent from FIGS. 9–11.

Figure 12:
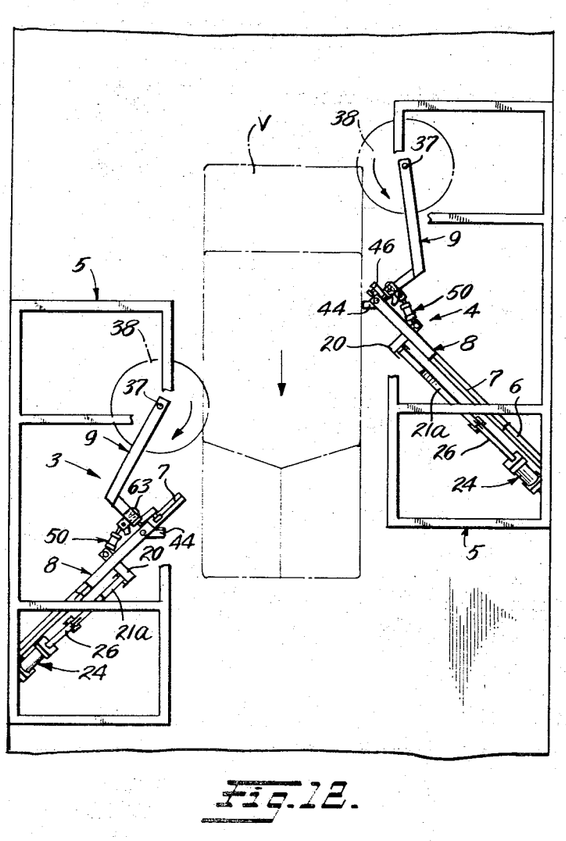
Figure 13:
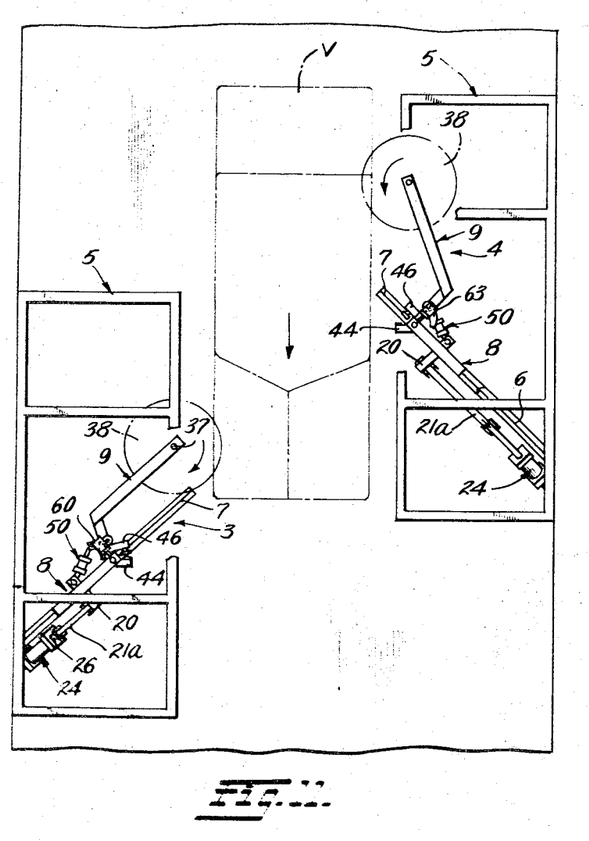

As seen by comparing FIGS. 12 and 13, the brush of unit 4 ultimately rounds the adjacent rear corner of vehicle V. When this occurs, the force urging arm structure 9 away from stop 45 is removed and device 50 therefore becomes effective to swing the arm structure generally in the direction of travel of the vehicle. The rapidity with which this swinging action occurs moves brush 38 forwardly at a rate slightly in excess of the rate of movement of the vehicle V, and the swinging action accordingly is effective to maintain the brush 38 in positive engagement with the rear of the vehicle. As arm structure 9 starts to swing forwardly, in the direction of travel of the vehicle, cam plate 63 is moved to allow roller 62 and arm 61 to return to their initial positions, so that valve 60 returns to its initial condition, in which the valve places the upper portion of reservoir 67 in communication with the atmosphere. At this stage, carriage 8 is fully extended. With the carriage fully extended, the length of arm structure 9 is such that brush 38 reaches the center of the rear of the vehicle (as seen in FIG. 13) before stop members 45, 47 become engaged to cause the brush to remain stationary while the vehicle continues its forward progress. With stop members 45, 47 engaged, brush unit 4 is ready to perform its cleaning operation on the next vehicle hauled along track 1 by chain mechanism 2.

Figure 14:
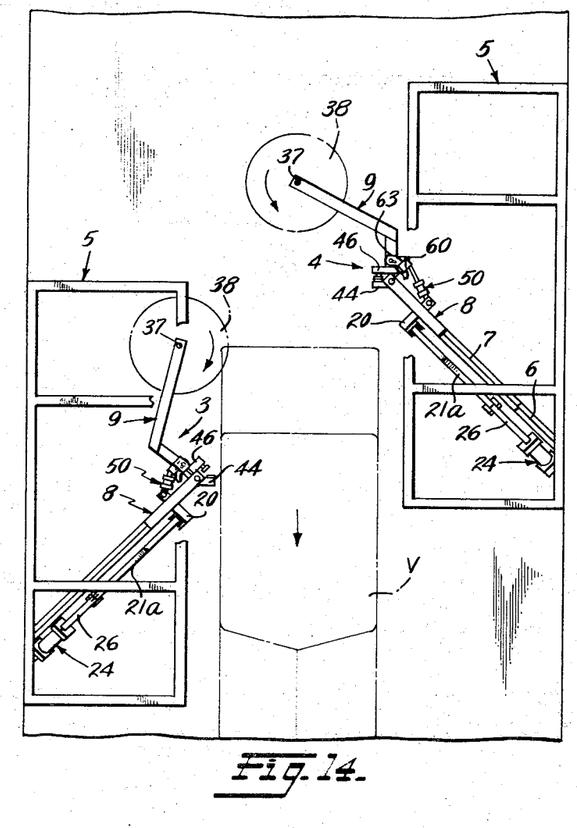
Figure 15:
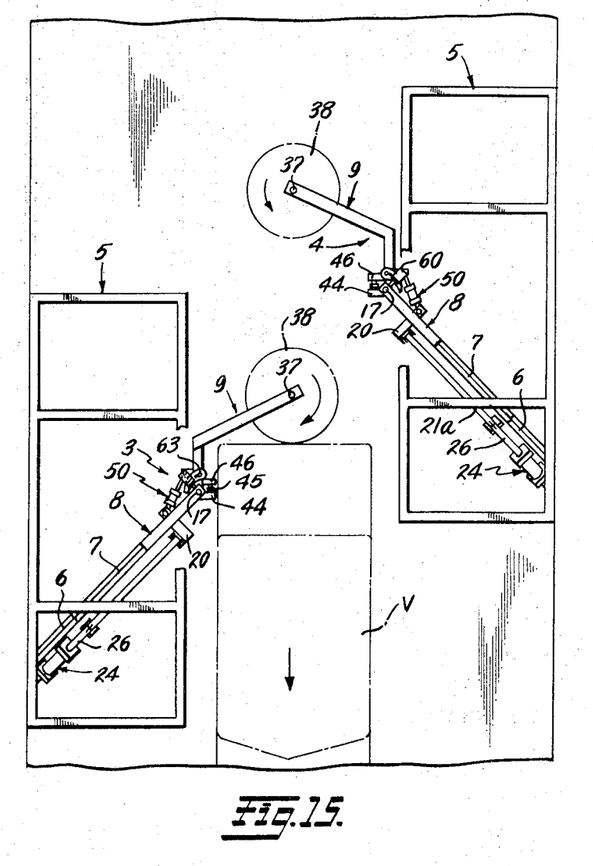

As seen in FIGS. 14 and 15, further progress of the vehicle allows brush 38 of unit 3 to complete the cleaning of the adjacent side of the vehicle, to then round the corresponding rear corner of the vehicle, and finally to traverse and clean the adjacent half of the rear of the vehicle, all as described with regard to unit 4.

As will be understood by those skilled in the art, the brush units 3, 4 can be equipped with, or used in conjunction with, any suitable type of wash liquid supply, including any of the usual spray devices oriented to direct wash liquid onto the surfaces engaged by the brushes 38. Through a particular form of rotary brush has been shown and described, it will be understood that any suitable mechanical cleaning device can be employed, so long as its action is effective both to clean the vehicle surface and to provide a traversing action equivalent to the rolling action of the rotary brushes.

What is claimed is:
1. In a vehicle washing apparatus of the type wherein the vehicle to be washed is advanced through the apparatus along a predetermined path, the combination of a carriage;
   track means mounting said carriage, at one side of the predetermined path of advance of the vehicles to be washed, for rectilinear horizontal movement toward and away the path of advance along a line which diverges forwardly and outwardly from the path of advance;
   an elongated rotary cleaning device;
   support means operatively supporting said cleaning device,
       said support means being mounted on said carriage for swinging movement about an at least generally upright axis, said support means extending from said carriage toward the path of advance and having a free end spaced from said axis toward the path of advance;
       said support means including bearing means rotatably supporting said elongated rotary cleaning device and restraining said cleaning device to rotate about an at least generally upright axis of rotation;
   drive means operatively connected to said cleaning device to rotate the same about said axis of rotation;
   rectilinear power means operatively connected to said carriage for moving the same along said line toward the path of advance; and
   control means for energizing and deenergizing said power means,
   said carriage, track means and support means being so constructed and arranged that operation of said power means can move said carriage along said line to a location allowing said cleaning device to engage the front of a vehicle approaching along the path of advance, and rectilinear movement of said carriage along said line can, in response to advance of the vehicle and selective operation of said power means, allow said cleaning device to successively traverse the front, the adjacent side and the rear of the vehicle.

2. The combination defined in claim 1, wherein said rectilinear power means comprises
   a fluid pressure-operated motor,
       first means for supplying fluid at a higher pressure to cause said motor to drive said carriage toward the path of advance, and
       second means for supplying fluid at a lower pressure to bias said motor in the opposite direction to compensate for frictional forces tending to resist movement of said carriage, whereby engagement of said cleaning device with the vehicle can, as the vehicle advances, cause said carriage to move along said line away from the path of advance when said motor is not operated to drive said carriage.

3. The combination defined in claim 1, and further comprising
   first means for limiting swinging movement of said support means in that direction which is generally the direction of advance of the vehicle being washed; and
   second means for limiting swinging movement of said support means in the opposite direction.

4. The combination defined in claim 3, wherein said second means comprises means yieldably resisting swinging movement of said support means and thereby assuring positive engagement of said rotary cleaning device with the vehicle.

5. The combination defined in claim 3, wherein the combined effective lengths of said carriage and said support means are such that, when said carriage has been moved toward the path of advance to a predetermined extent, said rotary cleaning device will engage the central portion of the front of a vehicle approaching along the path of advance, such engagement resulting in swinging movement of said support means generally in the direction of travel of the vehicle, followed by movement of said carriage away from the path of advance until the rotary cleaning device rounds the corresponding corner of the vehicle, and
   said control means is operative to energize said power means, to initiate movement of said carriage toward the path of advance, in response to swinging movement of said support means in said opposite direction, such swinging movement resulting as said cleaning device rounds the corner of the vehicle and engages the side of the vehicle.

6. The combination defined in claim 5, wherein said line of rectilinear movement of said carriage diverges from the path of advance at an angle of 15–85°.

7. The combination defined in claim 5, wherein said second means is constructed and arranged to move said support means to the limit established by said first means, whereby when the vehicle being washed has advanced to a point where said rotary cleaning device is at the corresponding rear corner of the vehicle, said second means swings said support means to maintain said rotary cleaning device in engagement with the rear of the vehicle until said rotary cleaning device has reached the central portion of the rear of the vehicle.

8. The combination defined in claim 7, wherein said second means is a fluid pressure-biased expansible chamber device connected between said support means and said carriage.

References Cited

UNITED STATES PATENTS

| 3,421,169 | 1/1969 | Hergonson | 15—21(C3) |
| 3,434,172 | 3/1969 | Wilson | 15—21(C3) |

FOREIGN PATENTS

| 1,064,006 | 4/1967 | Great Britain | 15—CCP |

EDWARD L. ROBERTS, Primary Examiner

U.S. Cl. X.R.

15—53